United States Patent
Sumiyoshi et al.

[11] 3,766,367
[45] Oct. 16, 1973

[54] CONSTANT SPEED CONTROL SYSTEM FOR VEHICLES

[75] Inventors: Masaharu Sumiyoshi; Osamu Ito, both of Toyota; Takaaki Kato, Toyohashi, all of Japan

[73] Assignees: Wippondenso Co. Ltd., Aichi-ken; Toyota Jidosha Kogyo Kabushiki Kaisha, Toyota-shi, Japan

[22] Filed: Oct. 15, 1971

[21] Appl. No.: 189,626

[30] Foreign Application Priority Data
Oct. 16, 1970 Japan.............................. 45/91454
Feb. 4, 1971 Japan.............................. 46/4383

[52] U.S. Cl............. 235/150.2, 123/102, 180/105 E
[51] Int. Cl....................... B60k 31/00, G05d 13/58
[58] Field of Search.............................. 235/150.2; 180/105 E; 123/102; 317/5; 340/172.5; 318/587, 600, 601, 603

[56] References Cited
UNITED STATES PATENTS

| | | | |
|---|---|---|---|
| 3,599,154 | 8/1971 | Carol, Jr. et al. | 180/105 E |
| 3,485,316 | 12/1969 | Slavin et al. | 180/105 |
| 3,455,411 | 7/1969 | Carp et al. | 123/102 X |
| 3,476,205 | 11/1969 | Kato | 180/105 |
| 3,570,622 | 3/1971 | Wisner | 180/105 E |
| 3,575,256 | 4/1971 | Jania et al. | 180/105 |
| 3,580,355 | 5/1971 | Kitano et al. | 180/105 E |
| 3,647,017 | 3/1972 | Brainard et al. | 180/105 |
| 3,648,808 | 3/1972 | Kato | 123/102 X |

*Primary Examiner*—Felix D. Gruber
*Attorney*—Cushman, Darby & Cushman

[57] ABSTRACT

A constant speed control system for vehicles wherein the sum of pulse signals proportional in number to the actual road speed of a traveling vehicle and pulse signals proportional in number to the opening of a throttle valve in the vehicle engine are stored in a first storage circuit to provide a vehicle set speed, the sum of pulse signals proportional in number to the continually changing actual vehicle speed and pulse signals proportional in number to the throttle opening corresponding to the continually changing actual vehicle speed are stored in a second storage circuit, and the values stored in said first and second storage circuits are compared in a comparison circuit to ascertain their relative magnitude one to another, whereby the opening of the throttle valve in the vehicle engine is adjusted in accordance with the result of the comparison so as to regulate the actual vehicle speed to a vehicle set speed thereby accomplishing constant speed control of the vehicle.

8 Claims, 6 Drawing Figures

CONSTANT SPEED CONTROL SYSTEM FOR VEHICLES

BACKGROUND OF THE INVENTION

1. Field of the Invention

The present invention relates to a constant speed control system for vehicles which is designed to drive a vehicle driven from an internal combustion engine, particularly an automotive vehicle at a constant speed according to the vehicle set speed.

2. Description of the Prior Art

Conventional constant speed control systems of this type have been designed such that when a vehicle is being driven at any suitable speed and it is desired to control the speed of the vehicle at that vehicle speed, that DC voltage which corresponds to the actual vehicle speed and the throttle opening existing at the time of setting the vehicle speed are tentatively stored so that a DC voltage corresponding to the actual vehicle speed and the throttle opening after the setting of the vehicle speed is compared with the stored DC voltage to detect the deviation between the actual vehicle speed and the vehicle set speed and control the throttle opening according to the detected deviation.

A disadvantage of the conventional systems of the type described above is that when setting the desired vehicle speed, the voltage corresponding to the actual vehicle speed and the throttle opening is stored on a capacitor or it is received and retained by a potentiometer through a servomotor in the form of its analog measurement, i.e., as a DC voltage per se. Thus, in the case of the capacitor the DC voltage which is a reference value is caused to fluctuate by the leakage current as well as by variations in the power supply voltage and the ambient temperature, whereas in the case of the servomotor and the potentiometer not only is the DC voltage which is a reference value caused to fluctuate with variations in the power supply voltage, ambient temperature and the like but also the systems tend to be large and thus become unfit for use in an automobile, for example, which is restricted in the available space for mounting. Moreover, since as explained above, analog operations are performed, errors generated in elements directly affecting the magnitude of the signals whether they be control outputs or parametric values should be minimized since they have a decided effect on performance. On the other hand, integrated circuits operating generally in accordance with 0 - 1 combinations have less of an influence on performance of the overall system.

SUMMARY OF THE INVENTION

It is a first object of the present invention to provide a constant speed control system for vehicles, wherein in order to effect the constant speed control of a traveling vehicle with the speed at that time as the vehicle set speed, the sum of pulse signals proportional in number to that actual vehicle speed and pulse signals proportional in number to the opening of an engine throttle valve are stored in a first storage circuit to provide the vehicle set speed and, after the vehicle speed has been set, the sum of pulse signals proportional in number to the everchanging actual vehicle speed and pulse signals proportional in number to the everchanging vehicle engine throttle opening are stored in a second storage circuit, whereby the values stored in the first and second storage circuits are compared in a comparison circuit to ascertain their relative size one to the other to adjust the opening of the throttle valve in the vehicle engine according to the result of the comparison. In this way, the actual vehicle speed can be controlled to correspond to a constant vehicle set speed which may be stored or set instantaneously in an electrical storage circuit. Moreover, all of the aforesaid memory, comparison and other operations can be performed digitally and thus the system according to the present invention is stable and highly accurate in operation without any danger of being affected by variations in the power supply voltage, ambient temperature and the like and at the same time the employment of integrated circuits can be readily accomplished thus making the system smaller and lighter to such an extent that the system can be readily installed in smaller cars.

It is a second object of the present invention to provide a constant speed control system of the type described, wherein the first and second storage circuits comprise storage circuits designed to store information in the form of a binary sequence and thus the memory action can be more rapidly performed in a simpler and more accurate manner.

It is a third object of the present invention to provide a constant speed control system of the type described, wherein the first and second storage circuits comprise storage circuits designed to store information in the form of a binary sequence and the comparison circuit also comprises a circuit for comparing the binary sequences in each of the bit positions, whereby the operation of the comparison circuit can be effected rapidly and in a simple and accurate manner.

It is a fourth object of the present invention to provide a constant speed control system of the type described which further includes an adding means for receiving pulse signals proportional in number to the vehicle speed in a unit time and pulse signals proportional in number to the opening in a unit time of a throttle valve in the vehicle engine with the one following close behind the other in time to produce some pulse signals which represent the sum of said two kinds of pulse signals added together through logical circuits retaining their sequential relation in time. Thus, the addition of said pulse signals can be effected through a very simple procedure and moreover the operation of addition can be performed accurately and rapidly in a very simple circuit construction.

According to the present invention, the actual road speed of a vehicle equipped with an internal combustion engine can be regulated at a constant speed which conforms to the vehicle set speed which can be stored rapidly and accurately in an electrical storage circuit, moreover this memory operation and other operations including the operation of comparison and so on can be performed entirely digitally, i.e., by those digital circuits which make use of "1" and "0" signals, whereby the system of the present invention can be ensured to operate in a stable and highly accurate manner without any danger of being affected by variations in power supply voltage, ambient temperature and the like and the system can also be made smaller and more compact through increased use of integrated circuits so that the system may be readily installed in smaller cars without any trouble in finding space required for the installation thereof.

According to the present invention, it is an object that the first and second storage circuits can comprise storage circuits designed to store information in the form of a binary sequence and thus the first and second storage circuits can perform the memory operation reliably, rapidly and simply and at the same time a highly accurate memory operation can be ensured.

According to the present invention, it is an object that since the first and second storage circuits comprise storage circuits designed to store informtion in the form of a binary sequence and further the comparison circuit comprises a circuit for performing a comparison operation in each of the bit positions of the two binary sequences, the comparison operation of the comparison circuit can be effected rapidly and simply and in an accurate manner.

According to the present invention, it is yet another object that since an adding means is included which receives pulse signals proportional in number to the vehicle speed in a unit and pulse signals proportional in number to the opening in a unit time of a throttle valve with one following close behind the other in time to produce pulse signals representing the sum of said two pulse signals added together through logical circuits while retaining their sequential relationship in time, the operation of addition of the pulse signals proportional to the vehicle speed and the pulse signals proportional to the opening of the throttle valve in the system of the present invention can be effected through a very simple procedure as compared with the case where the two kinds of pulse signals are first stored in their respective storage circuits and they are then added together. Moreover, the addition can be effected accurately and rapidly with an extremely simple circuit construction.

BRIEF DESCRIPTION OF THE DRAWING

FIGS. 4(A) through 4(K) are waveform diagrams of the voltages at the various parts of the circuitry which are useful for explaining the operation of the system according to the present invention.

DESCRIPTION OF THE PREFERRED EMBODIMENTS

Figure 1:
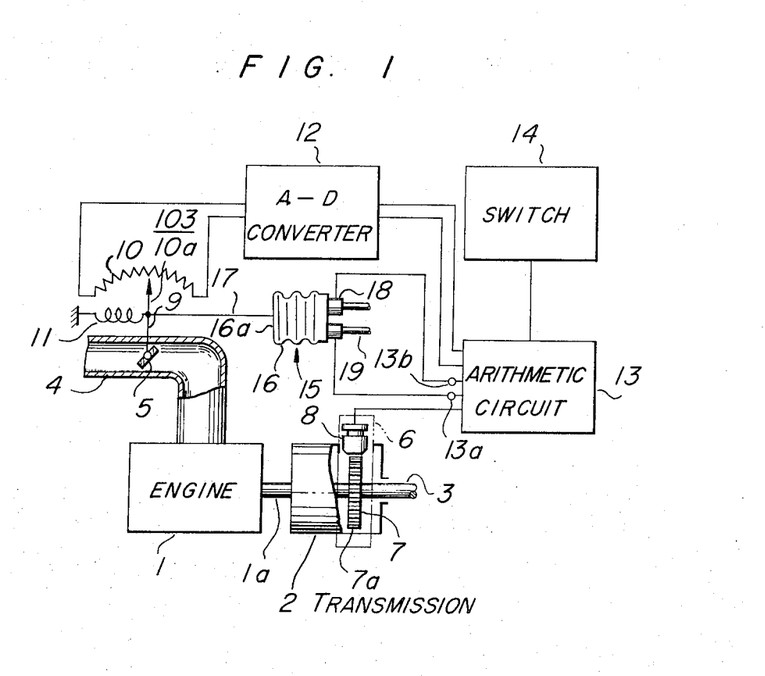
FIG. 1 is a schematic block diagram of an embodiment of the constant speed control system for vehicles according to the present invention, with part thereof being shown in section.

The present invention will now be explained with reference to the illustrated embodiments. Referring first to FIG. 1, numeral 1 designates an internal combustion engine installed in a vehicle; 2 a transmission for transmitting the rotation of an output shaft 1a of the internal combustion engine 1 to a propeller shaft 3 with certain gear reduction ratios. The propeller shaft 3 transmits the rotational driving force to the wheels (not shown) to drive the vehicle. Numeral 4 designates an intake manifold of the internal combustion engine 1; 5 a throttle valve rotatably mounted in the intake manifold 4 whose opening is adjusted to vary the amount of air-fuel mixture supplied into the cylinders of the engine 1 and thus control the number of revolutions of the engine. Numeral 6 designates a vehicle speed detector; 7 a toothed disk of the detector 6 which is made of a magnetic material and provided with a plurality of teeth 7a formed on the outer edge thereof, the toothed disk 7 being mounted on the propeller shaft 3. Numeral 8 designates a transducer comprising a permanent magnet having a coil wound around the outer periphery thereof, the transducer 8 being disposed adjacent the outer periphery of the toothed disk 7.

As the engine 1 rotates so that the vehicle is driven and the propeller shaft 3 also rotates, the toothed disk 7 rotates varying the magnetic flux interlinking with the coil of the transducer 8 and thus inducing an AC waveform voltage shown in FIG. 4(B) in the transducer coil.

Figure 2:
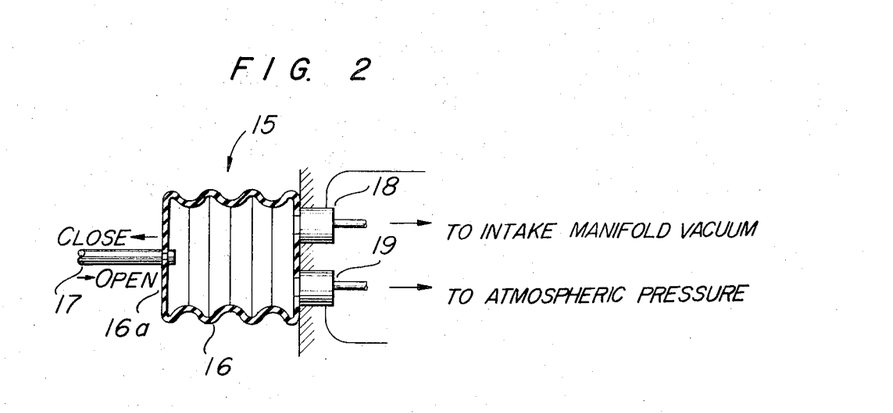
FIG. 2 is a diagram of valve operating means employed in the embodiment of FIG. 1, with part thereof being shown in longitudinal section.

Thus, the signal induced in the transducer coil has a repetition frequency equivalent to the number of revolutions of the propeller shaft 3 in a unit time multiplied by the number of teeth in the toothed disk 7. In other words, this signal has a repetition frequency proportional to the revolutions of propeller shaft 3 in a unit time, i.e., the vehicle speed. Numeral 103 designates a throttle sensor for generating a signal corresponding to the opening of the throttle valve 5, in which numeral 9 is an arm having one end connected to the rotating shaft of the throttle valve 5 and the other end connected to a slider 10a of a potentiometer 10 so that the slider 10a rotates in proportion to the opening of the throttle valve 5 varying the resistance value of the potentiometer 10 and thus producing a DC voltage which changes with the variations of this resistance value. Numeral 11 designates a spring for closing the throttle valve 5 whose spring force exerts a force which normally rotates the throttle valve 5 in a direction to close it. Numeral 12 designates an anolog-to-digital converter circuit (hereinafter referred to as an A-D converter) designed to convert the DC voltage produced across the potentiometer 10 and proportional to the opening of the throttle valve 5 into pulses whose number is proportional to that throttle opening. Numeral 13 designates an arithmetic circuit for receiving the electrical signal produced by the vehicle speed detector 6, which is proportional to the vehicle speed and the output pulse signals from the A-D converter 12 to ascertain the relative magnitude of the actual vehicle speed and the vehicle set speed one to another in a manner which will be explained later, so that when the former is greater than or equal to the latter an output signal is produced at its output terminal 13a, while an output signal is produced at its output terminal 13b when the former is smaller than the latter. Numeral 14 designates a switch mounted in the driver's compartment of a vehicle for manual operation by the driver, the switch 14 comprising a push button switch, for example, which is pushed in and then released to set the vehicle set speed. The switch 14 completes a circuit which establishes an output for setting vehicle speed which output is stored and then terminated upon release of the switch 14. Numeral 15 designates throttle valve operating means whose detailed construction is shown in FIG. 2 and which comprises a bellows 16 having its upper end 16a connected to the arm 9 through an operating rod 17, such as a link rod or a flexible wire. Numerals 18 and 19 designate solenoid valves which are closed when no current is supplied to their solenoid coils, with the solenoid valve 18 being adapted to open when the output signal produced at the output terminal 13b of the arithmetic circuit 13 is applied to its solenoid coil so that the vacuum produced in a vacuum source, such as the intake manifold 4 of the engine 1 is introduced into the bellows 16 causing it to contract against the spring force thereof and thus rotating the throttle valve 5 through the operating rod 17 in the direction which opens it. The other solenoid valve 19 opens upon application to its solenoid coil of the output signal produced at the output terminal 13a of the arithmetic circuit 13 and this admits the atmospheric pressure into the bellows 16 so that the bellows 16 expands by virtue of its spring force and the spring force of the spring 11 causing the throttle valve 5 to rotate through the operating rod 17 and by the spring force of the spring 11 in the direction which closes it. The valve operating means 15 is connected entirely independent of the linkage associated with the accelerator pedal.

Figure 3:
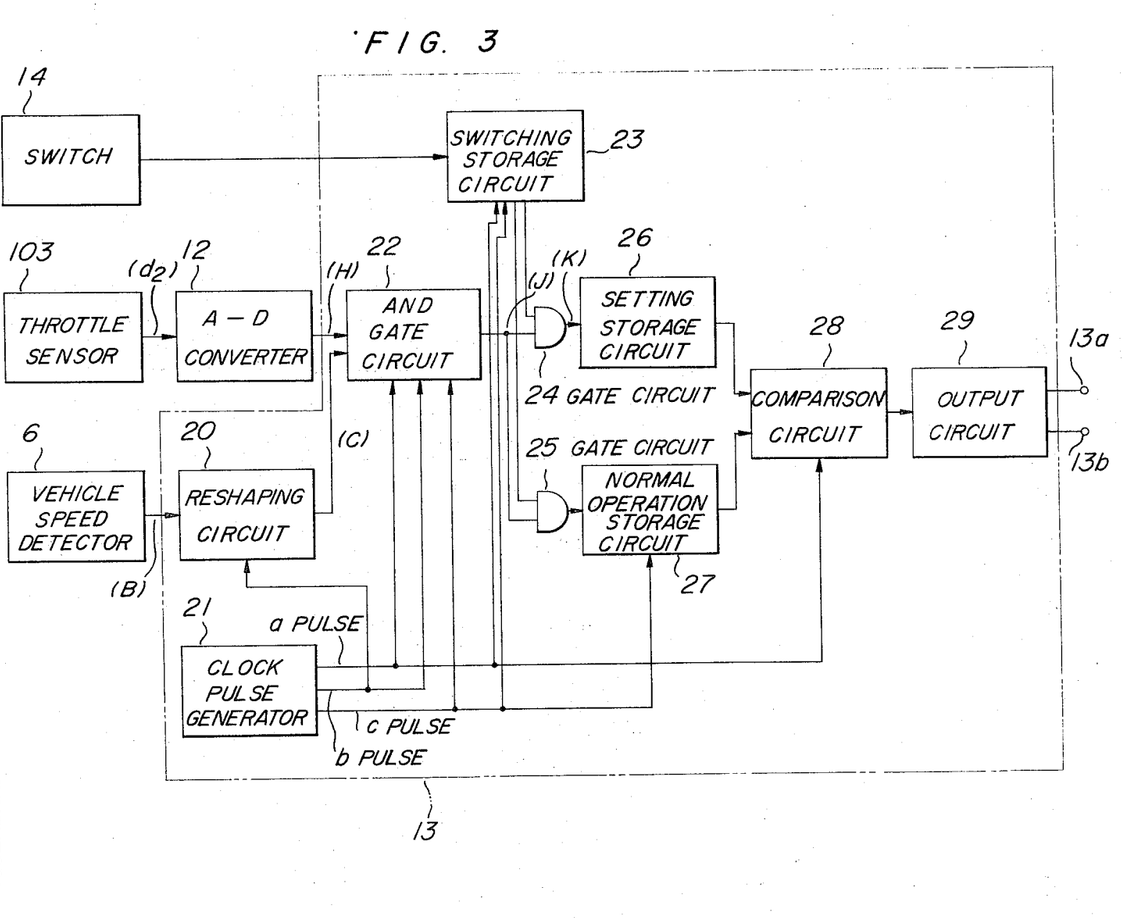
FIG. 3 is a block diagram of the arithmetic circuit used in the embodiment of FIG. 1.

The construction of the arithmetic circuit 13 is shown in FIG. 3 in which numerals 6, 10, 12 and 14 designate the previously explained vehicle speed detector, potentiometer, A-D converter and switch 14. Numeral 20 designates a reshaping circuit conventionally comprising, for example, a combination of an amplifier circuit, a monostable multivibrator for changing the signal induced in the coil of the transducer 8 of the vehicle speed detector 6 and having the AC waveform shown in FIG. 4(B) into rectangular pulse signals having a predetermined amplitude as shown in FIG. 4(C). The A-D converter 12 which converts the DC voltage produced by the potentiometer 10 and proportional to the opening of the throttle valve 5 into rectangular pulses whose number is proportional to that throttle opening may be conventionally constructed such that the output pulse generated by a first astable multivibrator as shown in FIG. 4(D) is integrated by an integrator to produce an integrated output as shown at $d_1$ in FIG. 4(E) and this integrated output is then applied to a comparator along with the DC voltage shown at $d_2$ in FIG. 4(E) and proportional to the opening of the throttle valve 5 to produce the pulse signals shown in FIG. 4(F), whereby a NAND circuit performs the NAND operation on the pulse signals from the comparator, the pulse signals of FIG. 4(G) produced by a second astable multivibrator and the output pulses of the first astable multivibrator to thereby produce the pulse signals as shown in FIG. 4(H). Thus, the number of the pulse signals passed through the NAND circuit is proportional to the opening of the throttle valve 5.

In this connection, the time at which the integrator initiates its integrating action is synchronized with the clock pulses (b pulses) from a clock pulse generator 21, while the first and second astable multivibrators are designed such that they will be connected to the power source to start oscillating when the switch 14 is first closed and then released. The clock pulse generator 21 produces clock pulses a, b and c are produced in this sequence with a predetermined time difference therebetween and an a pulse in the next cycle is produced in coincidence with the c pulse in the preceding cycle. Numeral 22 designates a logic sum gate circuit comprising a first gate circuit which is opened with an a pulse from the clock pulse generator 21 to pass the output rectangular pulses from the reshaping circuit 20 and which is closed with a b pulse from the clock pulse generator 21 to stop the passage of the rectangular pulses from the reshaping circuit 20, and a second gate circuit which is opened with said b pulse to pass the output rectangular pulses from the A-D converter 12 and which is closed with a c pulse from the clock pulse generator 21 to stop the passage of the rectangular pulses from the A-D converter 12. Here, the time period between the occurrence of the b pulse and the occurrence of the c pulse is preselected to be sufficient to permit the A-D converter 12 to generate a number of rectangular pulses proportional to the input DC voltage, and the first and second gate circuits respectively comprise, for example, a conventional AND circuit or NAND circuit. Numeral 23 designates a switching storage circuit comprising first and second flip-flop circuits and a gate circuit consisting of an AND circuit or NAND circuit and adapted to perform operations such as storing the output established when switch 14 is closed after release thereof, upon receipt of an a pulse from the clock pulse generator 21. Numerals 24 and 25 designate gate circuits for respectively passing the output rectangular pulses from the logic sum gate circuit 22 to a setting storage circuit 26 and a normal operation storage circuit 27 according to the output signals from the switching storage circuit 23. Each of the gate circuits 24 and 25 comprises, for example, an AND circuit or NAND circuit and each of the setting storage circuit 26 and the normal operation storage circuit 27 comprises, for example, a conventional register consisting of a binary counter type storage circuit employing a plurality of flip-flops. Numeral 28 designates a comparison circuit for comparing the values stored in the setting storage circuit 26 and the normal operation storage circuit 27 to produce an output signal when the former is greater than the latter and produce no output signal when the former is smaller than or equal to the latter. The comparison circuit 28 comprises, for example, a plurality of gate circuits each circuit comprising such as an AND circuit or NAND circuit for comparing the outputs of the flip-flops in the setting storage circuit 26 and the normal operation storage circuit 27 in each bit position, and a gate circuit comprising for example, an AND circuit or NAND circuit for producing an output when all of the plurality of gate circuits produce their respective outputs. Numeral 29 designates an output circuit comprising, for example, a flip-flop which is switched on and remains in one stable state to produce an output signal at the output terminal 13b when the comparison circuit 28 produces its output signal. On the other hand, when the comparison circuit 28 produces no output signal, the output circuit 29 is switched off and remains in the other stable state to produce an output signal at the output terminal 13a. In other words, the comparison circuit 28 produces a signal when the actual vehicle speed is less than the vehicle set speed for switching output circuit 29 such that terminal 13a is producing an output for increasing vehicle speed. As previously noted when the actual speed is greater than the set speed terminal 13a is energized for effecting a decrease in vehicle speed.

Figure 4:
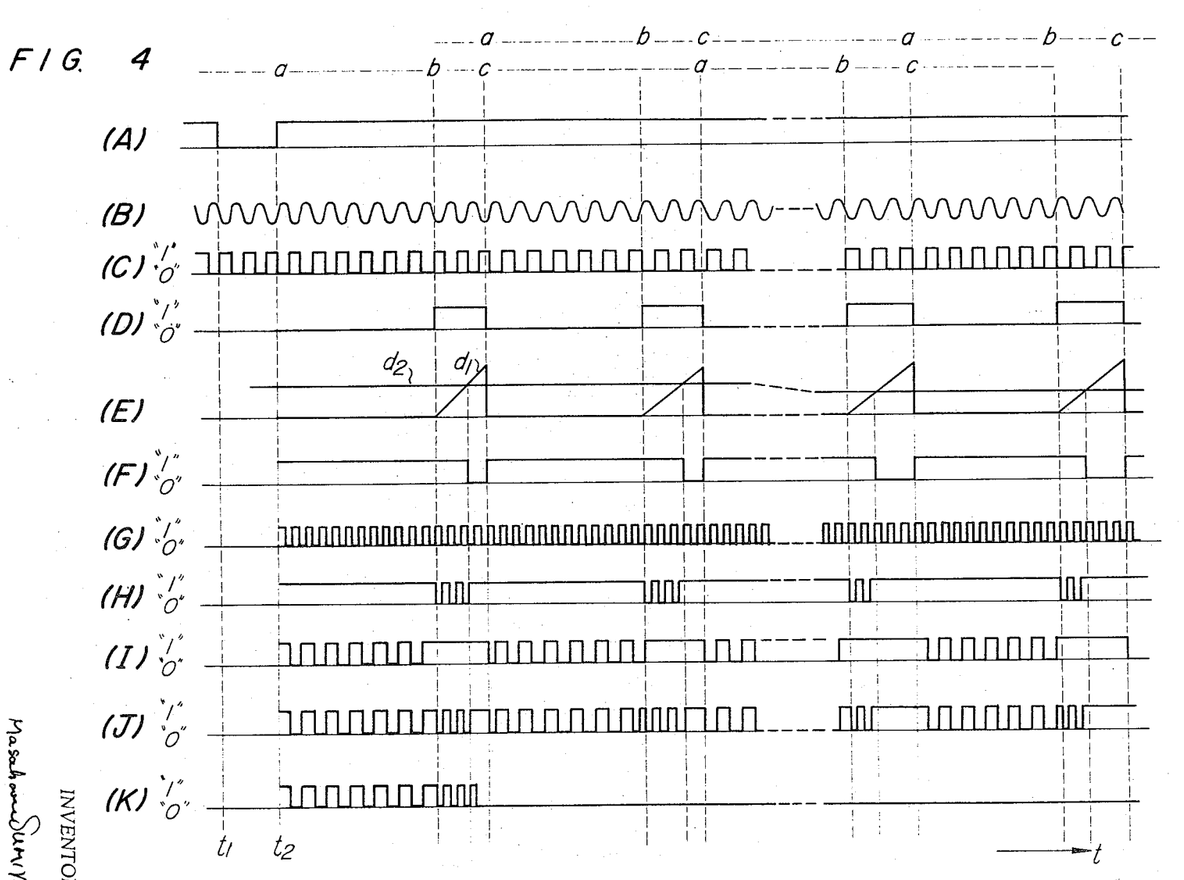

In FIGS. 4(A) through 4(K), the abscissas represent the time t which is common throughout the figures and "0" and "1" each of the ordinates represent a low level signal and a high level signal, respectively, while the symbols a, b and c at the top of FIG. 4 represent the times at which the a, b and c pulses generated by the clock pulse generator 21 occur.

The operation of the system of the present invention as constructed above will now be explained. When the vehicle is being driven, the reshaping circuit 20 produces rectangular pulse signals shown in FIG. 4(C) and having a repetition frequency proportional to the vehicle speed and the A-D converter 12 produces rectangular pulse signals shown in FIG. 4(H) and proportional in number to the opening of the throttle valve 5. The logic sum gate circuit 22 receives an a pulse from the clock pulse generator 21 opening the first gate circuit to permit the passage of the output rectangular pulses from the reshaping circuit 20 to the succeeding stage until the occurrence of a b pulse from the clock pulse generator 21 as shown in FIG. 4(I). Then, during the time interval between the occurrence of the b pulse and the occurrence of a c pulse, the second gate circuit is opened to pass the output rectangular pulses from the A-D converter 12 to the succeeding stage. In other words, the logic sum gate circuit 22 operates in a time-shared manner such that during the time interval between the occurrence of the a pulse and the occurrence of the c pulse, the output rectangular pulse signals from the reshaping circuit 20 and the output rectangular pulse signals from the A-D converter 12 are logically added together retaining their sequentially timed relationship to thereby send out pulse signals as shown in FIG. 4(J) to the succeeding stage. Assuming now that the switch 14 is first closed at time $t_1$ in FIG. 4 and then released at time $t_2$ in order to effect the constant speed control of the vehicle with the existing vehicle road speed as its set speed, a signal shown in FIG. 4(A) will be produced at the non-grounded terminal of the switch 14 so that this signal appearing upon the release of the switch 14 is applied to and stored in the first flip-flop of the switching storage circuit 23. Then, each time the first flip-flop stores the signal and the clock pulse generator 21 produces an a pulse, the gate circuit in the switching storage circuit 23 produces an output signal which is in turn stored in the second flip-flop of the switching storage circuit 23 and at the same time the signal stored in the second flip-flop is applied to the gate circuit 24. Thereafter, a c pulse generated by the clock pulse generator 21 clears the first and second flip-flops thereby producing a signal which is in turn applied to the gate circuit 25. Thus, only during a limited predetermined time period between the occurrence of an a pulse immediately following the releasing of the switch 14 at the time $t_2$ to select the vehicle set speed and the occurrence of a c pulse. While the signal is retained in the second flip-flop, the gate circuit 24 passes to the setting storage circuit 26 the sum rectangular pulse signals from the logic sum gate circuit 22, i.e., the pulse signals shown in FIG. 4(K). Thus the setting storage circuit 26 stores the input rectangular pulse signals in the form of a binary sequence by means of a plurality of flip-flops according to a binary counter system. In other words, the setting storage circuit 26 stores and retains the rectangular pulses representing the sum of those which are respectively proportional to the actual vehicle speed and the opening of the throttle valve 5 existing at the time of setting the vehicle speed, until the switch 14 is operated again. The content of the setting storage circuit 26 will be removed at the instant the switch 14 is closed again. When the setting storage circuit 26 completes its memory action in the manner thus far described, i.e., when the second flip-flop in the switching storage circuit 23 is cleared, the gate circuit 25 passes to the normal operation storage circuit 27 a train of rectangular pulses representing the sum from the logic sum gate circuit 22 during the time that said second flip-flop remains cleared and for the time interval between the occurrence of an a pulse and that of a c pulse in the succeeding cycles excepting the time interval between the occurrence of the a pulse and that of the c pulse immediately following the releasing of the switch 14. The normal operation storage circuit 27 then stores its applied input rectangular pulse train in the form of a binary sequence of digits by means of a plurality of flip-flops according to a binary counter system. In other words, the normal operation storage circuit 27 stores the sum of the rectangular pulse signals proportional in number to the everchanging actual vehicle speed and the rectangular pulse signals proportional in number to the everchanging opening of the throttle valve 5. Then, the outputs from the first, second, third, - - - , nth flip-flops (as seen from the input side) of the setting storage circuit 26 and the outputs from the first, second, third, - - - , nth flip-flops (as seen from the input side) of the normal operation storage circuit 27 are applied in corresponding relation, to the gates of the comparison circuit 28. The comparison circuit 28 compares, upon receipt of the a pulse, the outputs from the corresponding flip-flops of the two storage circuits 26 and 27, i.e., it performs a comparison in each bit position by means of its plurality of gates, whereby the comparison circuit 28 generates an output signal when the binary value stored in the setting storage circuit 26 is greater than the binary value stored in the normal operation storage circuit 27, while it generates no output signal when the former value is smaller than or equal to the latter value. The output circuit 29 is designed such that when the comparison circuit 28 generates an output signal, i.e., when the actual vehicle speed is less than the vehicle set speed, the flip-flop constituting the output circuit 29 switched to its one stable state thus producing at the output terminal 13b an output signal which is applied to the solenoid coil of the solenoid valve 18 in the valve operating means 15 to open the solenoid valve 18 and thus permit the vacuum from the vacuum source to enter into the bellows 16. When this happens, the bellows 16 contracts against its own spring force so that the amount of this contraction is transmitted to the arm 9 through the operating rod 17 to rotate the throttle valve 5 in the direction which opens it against the spring force of the spring 11. This in turn increases the number of revolutions of the engine 1 and thus the actual vehicle speed picks up to reach the vehicle set speed. Thereafter, while the normal operation storage circuit 27 is cleared by the c pulse so that the comparison circuit 28 stops its comparison operation, the output signal at the output terminal 13b of the output circuit 29 remains on and thus the solenoid valve 18 remains open to continuously rotate the throttle valve 5 in the direction which opens it during the time interval between the occurrence of the output signal from the comparison circuit 28 subsequent to the initiation of its comparison operation upon receipt of the a pulse as previously explained and the time at which the flip-flop of the output circuit 29 is switched to the other stable state. Then, as the clock pulse generator 21 generates an a pulse, the normal operation storage circuit 27 receives and stores the rectangular pulse signals newly generated by the logic sum gate circuit 22 through the gate circuit 25 during the time interval between the occurrence of the *a* pulse and the occurrence of a *c* pulse. When this happens, the comparison circuit 28 comes into operation again to compare the value stored in the setting storage circuit 26 and the value newly stored in the normal operation storage circuit 27 so that when the former is smaller than or equal to the latter, i.e., when the actual vehicle speed is greater than or equal to the vehicle set speed, the comparison circuit 28 produces no output signal and thus the output circuit 29 produces an output signal at the output terminal 13a which output signal in turn energizes the solenoid coil of the solenoid valve 19 in the valve operating means 15 to open the solenoid valve 19. Consequently, the vacuum which has been previously admitted into the bellows 16 is reduced to zero since the solenoid valve 19 is now opened to the atmosphere and thus the bellows 16 expands by virtue of its spring force and the spring force of the spring 11 so that the throttle valve 5 rotates under the spring force of the spring 11 in the direction which closes it and hence the number of revolutions of the engine 1 decreases to regulate the actual vehicle speed towards the vehicle set speed. Thereafter, while the normal operation storage circuit 27 is cleared by a *c* pulse thereby causing the comparison circuit 28 to stop its comparison operation as previously explained, the output signal at the output terminal 13a of the output circuit 29 continues to be on so that the solenoid valve 19 remains open and hence the throttle valve 5 continues to rotate in the direction which closes it during the time interval between the time that the comparison circuit 28 produces an output signal subsequent to the initiation of its comparison operation upon receipt of an *a* pulse as previously explained and the time that the flip-flop of the output circuit 29 is switched back to its original one stable state. Thereafter, the process described above is repeated and the opening of the throttle valve 5 rotated by the valve operating means 15 is fed back to the potentiometer 10 so that the throttle valve 5 is rotated in the direction which opens it when the value stored in the normal operation storage circuit 27 is less than the value stored in the setting storage circuit 26, i.e., when the actual vehicle speed is below the vehicle set speed, while the throttle valve 5 is rotated in the direction which closes it when the former is greater than the latter, i.e., when the actual vehicle speed is higher than the vehicle set speed. In this manner, the actual vehicle speed is always controlled and maintained at a value substantially equal to the vehicle set speed and thus permits the vehicle to be driven at the constant set speed.

It should be noted here that the present invention is not limited to the specific embodiment described above and many other changes and modifications should be apparent to those skilled in the art and come within the scope and spirit of the present invention. For example, one of the transmission gears in the transmission 2 may also be employed to concurrently perform the function of the toothed disk 7 of the vehicle speed detector 6. Furthermore, the opening of the throttle valve 5 may be detected in digital form from the beginning.

Figure 5:
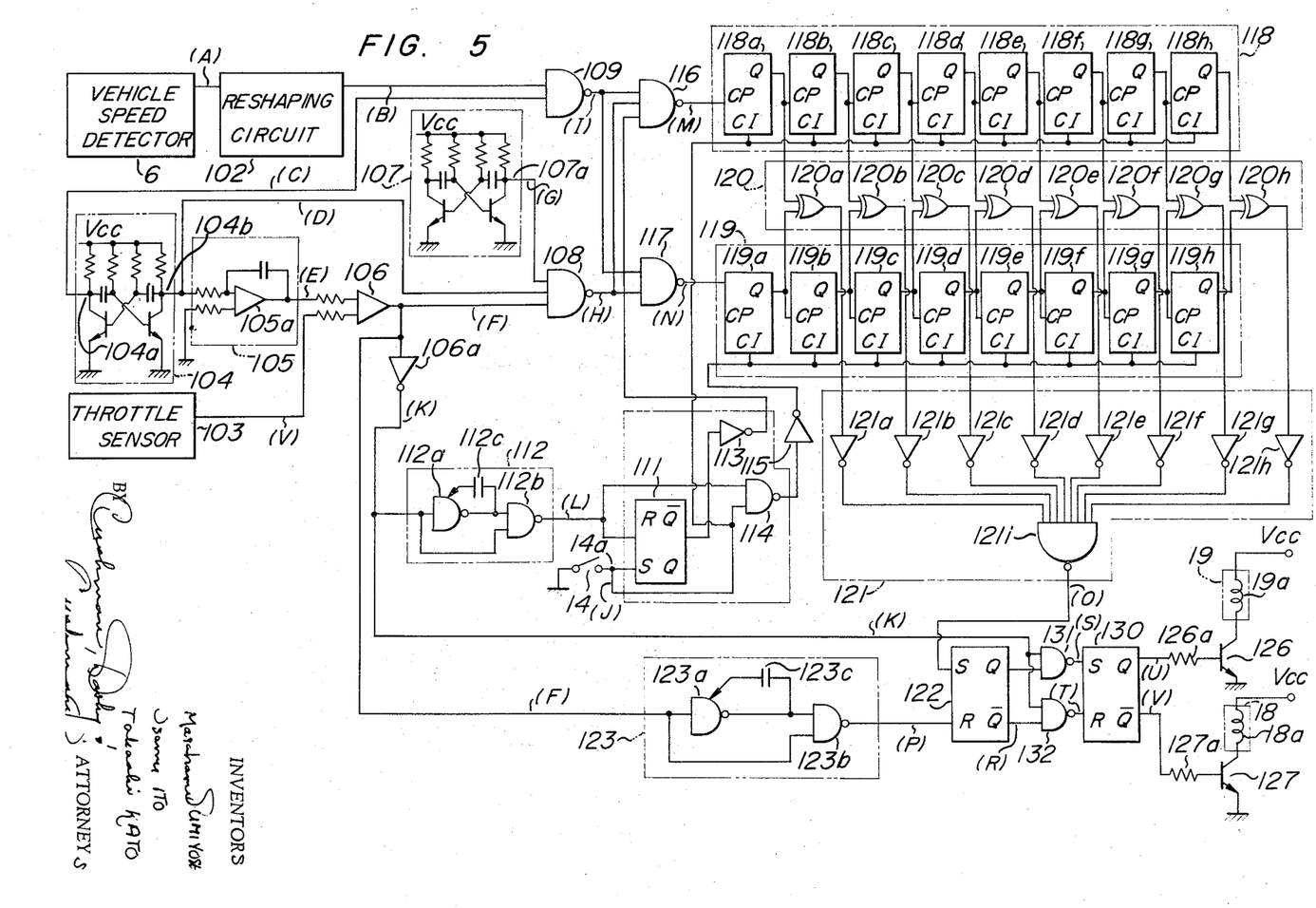
FIG. 5 is an electrical wiring diagram of another embodiment showing in detail the constant speed control system for vehicles according to the present invention.
Figure 6:
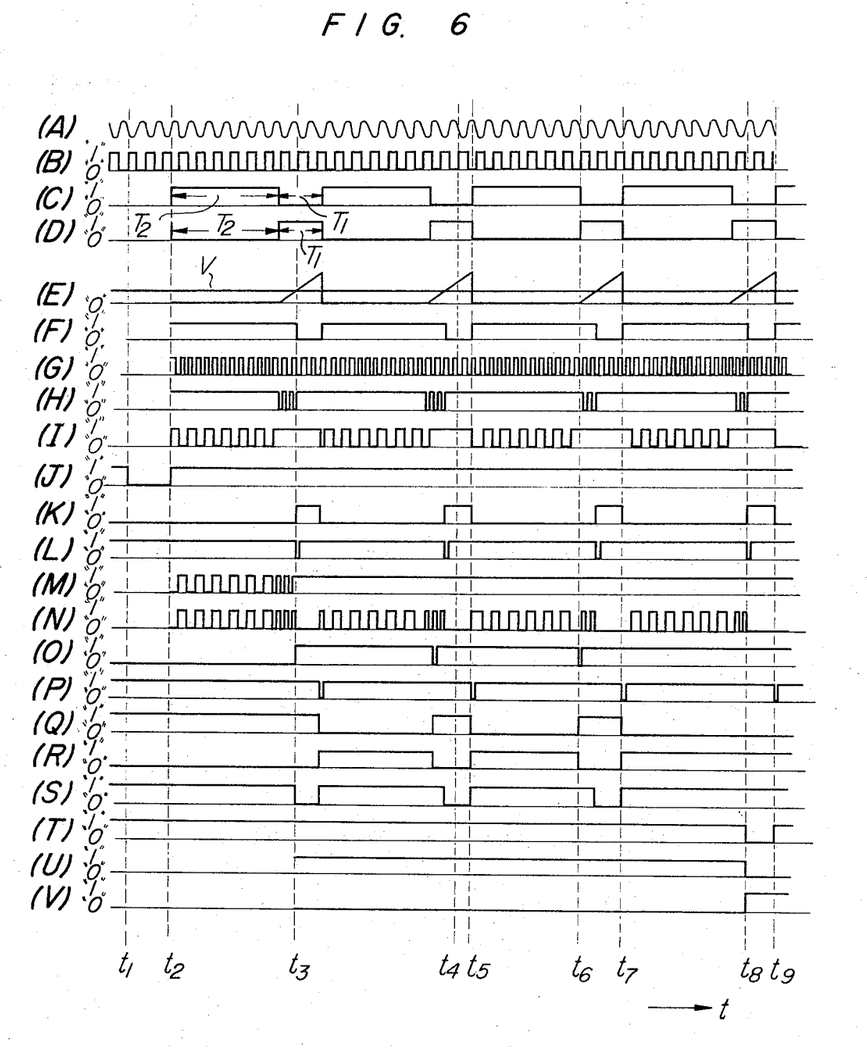
FIGS. 6(A) through 6(V) are waveform diagrams of the signal waveforms at the various parts of the circuitry, which are useful for explaining the operation of the system of the invention shown in FIG. 5.

Next, the present invention will be explained with reference to FIGS. 5 and 6 illustrating another preferred embodiment of the invention in detail. Referring first to FIG. 5, numeral 6 designates a vehicle speed detector of the type previously described which detects the actual vehicle speed in the form of a digital signal, i.e., an AC signal shown in FIG. 6(A) and having a frequency proportional to the vehicle speed; 102 a reshaping circuit for changing the AC signal from the vehicle speed detector 6 into rectangular pulses shown in FIG. 6(B) by utilizing the switching operation of a transistor, for example. Numeral 103 designates a throttle sensor for generating a DC voltage corresponding to the opening of a throttle valve in the vehicle engine and comprising, for example, a potentiometer linked to the rotary shaft of the throttle valve as previously explained in connection with the first embodiment. Numeral 104 designates an astable multivibrator for generating for generating reference pulse signals, i.e., for generating a reference pulse signal shown in FIG. 6(C) at its one output terminal 104a and at the other output terminal 104b another reference pulse signal shown in FIG. 6(D) and opposite in phase with respect to the reference pulse signal shown in FIG. 6(C). Numeral 105 designates an integrating circuit comprising an amplifier 105a and a feedback capacitor 105b for integrating the reference pulse signal generated at the output terminal 104b of the astable multivibrator 104 to produce sawtooth pulse signals shown in FIG. 6(E); 106 a comparison circuit for comparing the sawtooth pulse signal from the integrating circuit 105 with the DC voltage V from the throttle sensor 103 as shown in FIG. 6(E) to produce a pulse signal shown in FIG. 6(F) whose pulse width corresponds to the throttle opening; 107 an astable multivibrator for generating pulse signals shown in FIG. 6(G). Numeral 108 designates a NAND circuit for performing the NAND operation on the output signal generated at the output terminal 104b of the astable multivibrator 104, the output signal from the comparison circuit 106 and the output signal generated at the output terminal 107a of the astable multivibrator 107 to produce pulse signals shown in FIG. 6(H), which pulse signals represent the total count of the output pulses (FIG. 6(G)) from the astable multivibrator 107 that pass during the time $T_1$ of the reference pulse signal shown in FIG. 6(D) excluding the output pulse width (FIG. 6(F)) of the comparison circuit 106 and this total count of the pulse signals is proportional to the opening of the throttle valve. Numeral 109 designates a NAND circuit for performing the NAND operation on the output pulse signal (FIG. 6(B)) from the reshaping circuit 102 and the output pulse signal (FIG. 6(C)) produced at the output terminal 104a of the astable multivibrator 104 to produce pulse signals shown in FIG. 6(I), which pulse signals represent the total count of the output pulses from the reshaping circuit 102 that pass during the time $T_2$ of the reference pulse signal shown in FIG. 6(C) and this total count of the output pulses is proportional to the actual vehicle speed. Numeral 14 designates an automatic reset type push button which is closed temporarily only for setting the vehicle speed and produces a signal shown in FIG. 6(J) at its non-grounded terminal 14a; 111 a set-reset flip-flop (hereinafter simply referred to as an SRFF) having its set terminal S connected to the non-grounded terminal 14a of the switch 14. Numeral 112 designates a delay circuit comprising an inverter 112a consisting of a NAND gate, a NAND gate 112b and a capacitor 112c for receiving as its input a pulse signal, FIG. 6(K), which is the output pulse generated from the comparison circuit 106 and inverted by an inverter 106a to produce a pulse signal ("0" signal) synchronized with the rise time of the input pulse signal and having a short pulse width as shown in FIG. 6(L), the pulse signal thus produced being adapted to be applied to the reset terminal R of the SRFF 111. Numeral 113 designates an inverter for inverting the signal produced at the output terminal $\bar{Q}$ of the SRFF 111; 114 a two-input inverter comprising a NAND gate for inverting the signal produced at the nongrounded terminal 14a of the switch 14 and the output of the delay circuit 112, respectively; 115 an inverter for further inverting the output of the two-input inverter 114. In this connection, an electric circuit will be established between the power source and each of the astable multivibrators 104 and 107 when the switch 14 is first closed and then released to set the vehicle speed. Numeral 116 designates a NAND circuit for performing the NAND operation on the outputs from the inverter 113, NAND gate 109 and NAND gate 108 to produce, for example, the pulse signals shown in FIG. 6(M). In other words, the pulse signals having definite numbers of pulses corresponding respectively to the actual vehicle speed and the opening of a throttle valve in the vehicle engine existing at the time that the switch 14 is first closed and then released, such as the pulse signals shown in FIG. 6(I) and the pulse signals shown in FIG. 6(H) are added together in the direction of the time base to produce the aforesaid pulse signals shown in FIG. 6(M) only at the time that the setting of the vehicle speed is effected. Numeral 117 designates a NAND gate for performing the NAND operation on the outputs from the NAND gates 108 and 109 to produce, for example, the pulse signals shown in FIG. 6(N), that is, the pulse signals having definite numbers of pulses respectively corresponding to the actual vehicle speed and the opening of a throttle valve in the vehicle engine which are ever changing due to changes in the road conditions and the like, such as the pulse signals shown in FIGS. 6(I) and 6(H), respectively, are added together in the direction of the time base to produce the aforesaid set of pulse signals shown in FIG. 6(N) in a regularly recurrent manner. Numeral 118 designates a first storage circuit comprising in this particular embodiment eight JK flip-flops (hereinafter simply referred to as a JKFF) 118a through 118h which are interconnected with one another with reference characters $C_p$, CI and Q designating the clock pulse terminal, clear terminal and output terminal for each JKFF. The first stage JKFF 118a receives at its clock pulse terminal $C_p$ the output pulses from the NAND gate 116, and the clear terminals CI of all the JKFF's 118a through 118h are connected in common to the point 14a on the non-grounded side of the switch 14. Numeral 119 designates a second storage circuit comprising, as with the first storage circuit 118, eight JKFF's 119a through 119h which are also interconnected with one another, with the first stage JKFF 119a being adapted to receive at its clock pulse terminal $C_p$ the output pulses from the NAND gate 117 and the clear terminals CI of all the JKFF's 119a through 119h being connected in common to the output terminal of the inverter 115. It is to be noted here that while the first and second storage circuits 118 and 119 respectively comprise eight JKFF's, any number of the JKFF's may be sufficient for the purposes if only they can store (count) a set of pulse signals which is the sum of two kinds of pulses respectively corresponding in number to the highest vehicle speed and the largest throttle opening in the vehicle speed and throttle opening ranges for the constant speed control. Numeral 120 designates a comparison circuit comprising eight exclusive-OR gates 120a through 120h which are adapted such that the signals produced at the output terminals Q of the JKFF's 118a through 118h in the first storage circuit 118 are applied to the respectively associated one input terminals of the exclusive-OR gates 120a through 120h, while the signals produced at the output terminals Q of the JKFF's 119a through 119b in the second storage circuit 119 are applied to the respectively associated other input terminals of the exclusive-OR gates 120a through 120h. Numeral 121 designates a decision circuit comprising inverters 121a through 121h and a NAND gate 121i with the inverters 121a through 121h having their input terminals connected to the associated output terminals of the exclusive-OR gates 120a through 120h in the comparison circuit 120 and the NAND gate 121i being adapted to perform the NAND operation on the outputs from the inverters 121a through 121h to produce, for example, an output signal shown in FIG. 6(0). Numeral 122 designates an SRFF having its set terminal S connected to the output terminal of the NAND circuit 121i and producing at its output terminal Q an output signal shown in FIG. 6(Q) and at its output terminal $\bar{Q}$ an output signal shown in FIG. 6(R). Numeral 123 designates a delay circuit comprising an inverter 123a consisting of a NAND gate, a NAND circuit 123b and a capacitor 123c and adapted to receive as its input the output pulses from the comparison circuit 106 and produce a pulse signal ("0" signal) synchronized with the rise time of the input pulses and having a short pulse width as shown in FIG. 6(P). Numeral 130 designates an SRFF having its set terminal S and reset terminal R connected to the outputs of NAND gates 131 and 132, respectively, whereby the signal shown in FIG. 6(S) is applied to the set terminal S and the signal shown in FIG. 6(T) is applied to the reset terminal R, while the signal shown in FIG. 6(U) is produced at its output terminal Q and the signal shown in FIG. 6(V) is produced at its output terminal $\bar{Q}$. To the input terminals of the NAND gate 131 are applied the signal produced at the output terminal Q of the preceeding stage SRFF 122 and the output of the inverter 106a, while the signal produced at the output terminal $\bar{Q}$ of the preceding stage SRFF 122 and the output of the inverter 106a are applied to the input terminals of the other NAND gate 132. The solenoid coils 19a and 18a of the previously explained solenoid valves 19 and 18 are respectively connected to power transistors 126 and 127 as their collector loads and the bases of the power transistors 126 and 127 are respectively connected through resistors 126a and 127a to the output terminals Q and $\bar{Q}$ of the SRFF 130.

Next, the operation of the system of the invention constructed as shown in FIG. 5 will now be explained. Assuming now that the vehicle is traveling at a suitable speed and the push button 14 is pressed and closed at time $t_1$ in FIG. 6 to effect the constant speed control at that speed, a "0" signal is produced at the non-grounded terminal 14a of the switch 14 as shown in FIG. 6(J) so that the application of this "0" signal to the respective clear terminals CI of the JKFF's 118a through 118h in the first storage circuit 118 will clear the previously stored signals in the JKFF's 118a through 118h, if any. On the other hand, the "0" signal produced at the non-grounded terminal 14a of the switch 14 is inverted by the two-input inverter 114 producing a "1" signal which is in turn inverted by the inverter 115 so that the application of its inverted "0" signal to the respective clear terminals CI of the JKFF's 119a through 119h in the second storage circuit 119 will clear the previously stored binary signals in the JKFF's 119a through 119h, if any. The "0" signal produced at the non-grounded terminal 14a of the switch 14 is also applied to the terminal S of the SRFF 111 so that if the "1" signal appearing at the output terminal of the delay circuit 112 is simultaneously applied to the reset terminal R of the JKFF 111, the JKFF 111 will produce a "1" signal at its output terminal Q and a "0" signal at its output terminal $\bar{Q}$. Then, when the driver releases the push button switch 14 at time $t_2$, the switch 14 returns to its original open state by virtue of its self-restoring force so that if a "1" signal produced at the non-grounded terminal 14a of the switch 14 is applied to the set terminal S of the SRFF 111, both signals applied to the set terminal S and the reset terminal R of the SRFF 111 will be at "1" thus causing its output terminals Q and $\bar{Q}$ to hold the previously stored signals "1" and "0", respectively. On the other hand, the two astable multivibrators 104 and 107 start oscillating upon the releasing of the switch 14 so that the astable multivibrator 104 produces the reference pulse signal shown in FIG. 6(C) at its output terminal 104a. The NAND gate 109 receives at its one input terminal the rectangular pulse signals shown in FIG. 6(B), i.e., the AC signal proportional to the actual vehicle speed produced by the vehicle speed detector 6 and reshaped by the reshaping circuit 102, while the pulse signal produced at the output terminal 104a of the astable multivibrator 104 as shown in FIG. 6(C) is applied to the other input terminal of the NAND gate 109. Thus, the NAND gate 109 performs the NAND operation on its two input signals producing the output pulse signals as shown in FIG. 6(I). The number of the output pulse signals produced at the output terminal of the NAND gate 109 is proportional to the actual vehicle speed existing at that time. On the other hand, the "1" signal portion of the rectangular pulse signal, FIG. 6(D), produced at the output terminal 104b of the astable multivibrator 104 is integrated by the integrating circuit 105 producing an integrated output having the waveform shown in FIG. 6(E) and this integrated output is applied to one of the input terminals of the comparison circuit 106 whose the other input terminal is supplied with the DC voltage V from the throttle sensor **which is proportional to the opening of the throttle valve, whereby the comparison circuit 106 compares the two input signals and produces the pulse signal shown in FIG. 6(F) which will assume the "0" state when the former is greater than the latter. The pulse width of the pulse signal thus produced corresponds to the opening of the throttle valve. The output pulse signal of the comparison circuit 106 is applied to the input terminals the NAND gate 108 along with the pulse signal produced at the output terminal 104b of the astable multivibrator 104 and the pulse signal, FIG. 6(G), produced at the output terminal 107a of the astable multivibrator 107, so that the NAND gate 108 performs the NAND operation on the three input signals producing the pulse signals shown in FIG. 6(H). The number of the pulse signals produced at the output terminal of the NAND gate 108 is proportional to the existing opening of the throttle valve.

Thus, during the time width $T_2$ of the reference pulse signal shown in FIG. 6(C), the NAND gate 109 produces at its output terminal the pulse signals the number of which is proportional to the existing actual vehicle speed, while during the time width $T_1$ of the said reference pulse signal excluding the output pulse width of the comparison circuit 106 the NAND gate 108 produces at its output terminal the pulse signals proportional to the existing opening of the throttle valve. The output pulse signals from the NAND gates 109 and 108 are then applied to the two input terminals of the NAND gate 116 whose remaining one input terminal is supplied with a "1" signal which was the "0" signal produced at the output terminal $\bar{Q}$ of the SRFF 111 and inverted by the inverter 113. Thus, the NAND gate 116 performs the NAND operation on its three input signals. On the other hand, the delay circuit 112 produces the pulse signal ("0" signal) of FIG. 6(L) having a short pulse width and synchronized with the rise time (time $t_3$) of the pulse signal shown in FIG. 6(K) which was the output pulse signal produced by the comparison circuit 106 and inverted by the inverter 106a, and this "0" signal is then applied to the reset terminal R of the SRFF 111 so that the outputs of the SRFF 111 change their states producing a "0" signal at the output terminal Q and a "1" signal at the output terminal $\bar{Q}$. Consequently, since the time period that the "0" signal remains on at the output terminal $\bar{Q}$ of the SRFF 111, that is, the duration time of the "1" signal applied to the input terminal of the NAND gate 116 through the inverter 113 is the time between the time $t_1$ at which the switch 14 was closed and the time that the output pulse signal of the comparison circuit 106 falls, i.e., the time $t_3$ which is determined according to the existing opening of the throttle valve and since it is at the time $t_2$ that the NAND gate 109 starts producing the pulse signals corresponding to the vehicle speed at the output terminal thereof, the pulse signals shown in FIG. 6(M) are produced at the output terminal of the NAND gate 116 only for the time period $t_2 + t_3$. Thereafter, even if the delay circuit 112 produces a "0" pulse signal at its output terminal and the "0" pulse signal is then applied to the reset terminal R of the SRFF 111, the SRFF 111 does not change its state causing the "1" signal at its output terminal $\bar{Q}$ to continue until the switch 14 is reclosed and the inverter 113 also continues to generate the "0" signal. Thus, the NAND gate 116 continues to produce the "1" signal even if it receives pulse signals at the other input terminals thereof. In this manner, the pulse signals of FIG. 6(M) representing the sum of the pulse signals proportional in number to the actual vehicle speed existing at the time of setting the vehicle speed and the pulse signals proportional in number to the corresponding throttle opening which are added in the direction of the time base are produced for once only when the switch is first closed and then released for the purpose of setting the vehicle speed. The output pulse signals from the NAND gate 116 are then applied to the clock pulse terminal $C_p$ of the first stage JKFF 118a in the first storage circuit 118 and the applied pulse signals are thus stored in the eight JKFF's 118a through 118h in the form of a binary number in a binary system. The once stored binary number in the JKFF's 118a through 118h will never be cleared unless the switch 14 is closed again.

On the other hand, the application of the output pulse signals from the two NAND gates 108 and 109 to the NAND gate 117 causes the latter to perform the NAND operation on the both input pulse signals and thus produce pulse signals shown in FIG. 6(N), i.e., the pulse signals representing the sum of the pulse signals respectively proportional in number to the actual vehicle speed and the throttle opening which are everchanging due to changes in the road conditions and the like. The pulse signals thus produced are then applied to the clock pulse terminal $C_p$ of the first stage JKFF 119a in the second storage circuit 119 so that the applied pulse signals are stored in the eight JKFF's 119a through 119h in the form of a binary number in binary system. In this case, the pulse signals representing the sum of the pulse signals respectively proportional in number to the actual vehicle speed and the throttle opening are handled as a unit and in order that the binary number stored in the JKFF's 119a through 119h may be cleared at the time that the last pulse in said unit pulse signals is stored, the output pulse from the delay circuit 112 is inverted through the two-input inverter 114 and the inverter 115, respectively, to apply a "0" signal to the respective clear terminals CI of the JKFF's 119a through 119h. In this way, each time the delay circuit 112 generates its output signal, the previously stored binary number in the JKFF's 119a through 119h will be cleared to get them ready for the next memory action.

The binary numbers thus stored in the first and second storage circuits 118 and 119, respectively, are compared to detect a deviation from the set speed and for this purpose the signals produced at the respective output terminals Q of the JKFF's 118a through 118h in the first storage circuit 118 are applied to the one input terminals of the exclusive-OR gates 120a through 120h, while the signals produced at the respective output terminals Q of the JKFF's 119a through 119h in the second storage circuit 119 are applied to the other input terminals of the exclusive-OR gates 120a through 120h. Thus, in accordance with a predetermined logical convention, each of the exclusive-OR gates 120a through 120h produces a "0" signal only when the two inputs applied thereto comprise signals of the same level, such as two "1" signals or two "0" signals. Thus, by inverting the output signals from the exclusive-OR gates 120a through 120h by means of the inverters 121a through 121h and performing the NAND operation on the inverted signals by the NAND gate 121i, it can be ascertained whether the vehicle set speed is greater or smaller than the actual vehicle speed. When all of the exclusive-OR gates 120a through 120h produce a "0" signal at their respective output terminals as a result of the comparison between the binary numbers stored in the first and second storage circuits 118 and 119, that is, when the vehicle set speed stored in the first storage circuit 118 and the actual vehicle speed stored in the second storage circuit 119 become equal to each other, a "0" signal which causes the vehicle speed to decrease is momentarily produced at the output of the NAND gate 121i. While on the other hand, when at least any one of the exclusive-OR gates 120a through 120h produces a "1" signal as a result of the comparison between the binary numbers stored in the first and second storage circuits 118 and 119, it is ascertained that the actual vehicle speed is less than the vehicle set speed thus causing the NAND gate 112i to continuously produce a "1" signal. On the other hand, the delay circuit 123 receives the output pulses of the comparison circuit 106 as its input and thus produces "0" pulse signals synchronized with the rise time of the input pulses and having a short pulse width as shown in FIG. 6(P).

Now consider a time $t_4$ at which the actual vehicle speed is higher than the vehicle set speed and the NAND gate 121i is producing a "1" signal. This "1" signal is here applied to the set terminal S of the SRFF 122 and at the same time the "1" signal from the delay circuit 123 is applied to the reset terminal R of the SRFF 122. Thus, the previously stored "1" and "0" signals are respectively retained at the output terminals Q and $\overline{Q}$ of the SRFF 122. At this time, a "1" signal is present at the output terminal of the inverter 106a and thus the NAND gates 131 for performing the NAND operation on the "1" signal from the inverter 106a and the "1" signal at the output terminal Q and the NAND gate 132 for performing the NAND operation on the "1" signal from the inverter 106a and the "0" signal at the output terminal $\overline{Q}$ produce a "0" and "1" signal, respectively. These "0" and "1" signals are then received by the SRFF 130 as its set and reset inputs, respectively, thereby producing a "1" and "0" signal at its output terminals Q and $\overline{Q}$, respectively. The "1" signal produced at the output terminal Q of the SRFF 130 renders the power transistor 126 conductive and thus energizes the solenoid coil 19a of the solenoid valve 19 to open it. This introduces the atmospheric pressure into the bellows 16 and thus rotates the engine throttle valve in the direction which closes it thereby causing the vehicle speed to decrease. Then, when the delay circuit 123 produces a "0" signal at its output terminal at time $t_5$, this "0" signal is applied to the reset terminal of the SRFF 122. In this case, since the "1" signal has previously been applied to the set terminal S, the outputs of the SRFF 122 change their states producing a "0" signal at the output terminal Q and a "1" signal at the output terminal $\overline{Q}$. Thus, since the output signal of the inverter 106a has also changed from "1" to "0" previously, the output of the NAND gate 131 changes to a "1" signal and the output of the NAND gate 132 remains in the "1" state and hence the SRFF 130 retains the previously assumed states thus continuously holding the "1" signal at the output terminal Q and the "0" signal at the output terminal $\overline{Q}$ and still causing the vehicle speed to decrease. However, when at time $t_6$ the numbers stored in the first and second storage circuits 118 and 119 are compared by the comparison circuit 120 so that a signal which causes the vehicle speed to decrease is generated according to the decision of the decision circuit 121, that is, when a "0" signal is generated at the output terminal of the NAND gate 121i, the SRFF 122 is switched back to its original state thus producing a "1" signal at the output terminal Q and a "0" signal at the output terminal $\overline{Q}$. Thus, since the output signal of the inverter 106a is "0" at this time, the NAND gate 131 generates a "1" signal and the NAND gate 132 generates a "1" signal, however the SRFF 130 still retains its previously assumed state producing a "1" signal at the output terminal Q and a "0" signal at the output terminal $\overline{Q}$. This causes the vehicle speed to continue to decrease further and this decelerating condition remains unchanged even if at time $t_7$ a "0" signal is generated at the output terminal of the delay circuit 123 and thus the SRFF 122 is reset.

Then, in order to prevent the reduction of the vehicle speed from continuing further and to prevent the actual vehicle speed from dropping below the vehicle set speed, when at time $t_8$ a "1" signal which causes the vehicle speed to increase is generated continuously instead of a "0" signal at the output terminal of the NAND gate 121i as a result of the comparison between the values stored in the first and second storage circuits 118 and 119 (it is to be noted that said "1" signal has already been generated following the occurrence of the instantaneous "0" signal at the output of the NAND gate 121i), this "1" signal is applied to the set terminal S of the SRFF 122 and thus, with the "1" signal being applied to the reset terminal R, the SRFF 122 holds the previously stored state producing the "0" signal at the output terminal Q and the "1" signal at the output terminal $\bar{Q}$. However, since the output signal from the inverter $\Omega a$ changes from "0" to "1" at this time, even if the output signal of the NAND gate 131 is maintained "1", the output signal of the NAND gate 132 changes to "0" so that the SRFF 130 changes its state producing a "0" signal at the output terminal Q and a "1" signal at the output terminal $\bar{Q}$. When this happens, the power transistor 126 is rendered non-conductive cutting the supply of current to the solenoid valve 19 and thus stopping the speed reduction of the engine. While on the other hand, the power transistor 127 is rendered conductive by the "1" signal produced at the output terminal $\bar{Q}$ of the SRFF 130 so that the solenoid coil 18a of the solenoid valve 18 is energized opening the solenoid valve 18 and thus introducing the engine intake manifold vacuum into the bellows 16. This in turn rotates the throttle valve in the direction which opens it thereby increasing the engine speed, i.e., the vehicle speed. Then, at time $t_9$ the delay circuit 123 produces a "0" signal. However, since the NAND gate 131 holds the "1" signal at its output and the output signal of the NAND gate 132 changes to "1", the SRFF 130 holds its previously stored state continuously producing the "0" signal at the output terminal Q and the "1" signal at the output terminal $\bar{Q}$ and thus causing the vehicle speed to continue increasing.

Thereafter, the increase and decrease of the vehicle speed are repeated to control the everchanging actual vehicle speed at the vehicle set speed and thus achieve the constant speed control of the vehicle.

It should be appreciated that the present invention is not limited to the specific embodiments described hereinbefore and many changes and modifications should be readily apparent to those skilled in the art without departing from the scope and spirit of the present invention. For example, each of the first and second storage circuits 118 and 119 may comprise of clocked flip-flops, while the comparison circuit 120 may comprise, in a suitable combination, AND gates and NAND gates.

We claim:
1. A constant speed control system for vehicles comprising:
   pulse signal generating means for producing pulse signals each proportional in number and representative of vehicle speed and throttle valve opening, respectively;
   adding means for producing pulse signals during successive selected time intervals representing the sum of pulse signals proportional in number to the vehicle speed and pulse signals proportional in number to the opening of the throttle valve;
   a first storage circuit for storing said sum of pulse signals for a selected interval;
   a second storage circuit for storing said sum of pulse signals during a different interval from aforesaid;
   gate means for passing the output pulse signals from said adding means representing said sum to the first storage circuit only when the vehicle speed is set during said selected interval and thereafter to said second storage circuit;
   a comparison circuit for comparing the values stored in said first and second storage circuits to produce a first output signal when the former representing a desired speed is greater than the latter representing an actual speed and a second output signal when the former is smaller than the latter; and
   electromagnetically operated valve operating means for activating said throttle valve in a direction such that the vehicle speed is increased upon receipt of said first output signal from said comparison circuit and actuating said throttle valve in the direction such that the vehicle speed is decreased, upon receipt of said second output signal from said comparison circuit.

2. The constant speed control system for vehicles as recited in claim 1 wherein each of said first and second storage circuits comprise; a binary circuit adapted to store each of said summations of pulse signals in the form of a binary sequence.

3. The constant speed control system for vehicles as recited in claim 2 wherein said comparison circuit comprises:
   a binary circuit adapted to perform the comparison operation on said binary sequences in each of a plurality of bit positions thereof.

4. The constant speed control system for vehicles of claim 1 wherein said first and second storage circuits each thereof comprise; a plurality of flip-flops connected in cascade, and corresponding gate elements, wherein the pulse signals representing the sum of pulse signals proportional in number to the vehicle speed and pulse signals proportional in number to the opening of a throttle valve of the vehicle engine, are stored in said first storage circuit initially at the time of setting the vehicle speed and pulse signals representing the sum of pulse signals proportional in number to everchanging actual vehicle speed and pulse signals proportional in number to the everchanging opening of the throttle valve in the vehicle engine are stored periodically in said second storage circuit in the form of a binary number, the outputs of the corresponding flip-flops in said first and second storage circuits are applied respectively to associated inputs of corresponding gate element thereof in such a manner that an AND operation is performed on the outputs from said plurality of gate elements whereby the throttle valve opening is varied in accordance with the presence or absence of an output resulting from said AND operation.

5. A constant speed control system for vehicles comprising:
   a throttle sensor for producing an analog signal corresponding to a throttle opening;
   a vehicle speed detector for producing a digital signal having a frequency proportional to an actual vehicle speed;
   converter means connected to said throttle sensor for producing a digital signal having a frequency proportional to the throttle signal;

a logic sum gate circuit having two inputs connected to said vehicle speed detector and said converter for producing successive logic sum signals of said two inputs;

a first storage circuit connected to said logic sum gate circuit for storing the summed signals of said logic sum gate during a selected interval indicative of a desired speed in response to control signals;

a second storage circuit connected to said logic sum gate circuit for temporarily storing the summed signals of said logic sum gate indicative of a preceding actual speed in response to control signals;

a comparison circuit for comparing values stored in said first and second storage circuits to produce one or another resultant signal; and an electromagnetically operated valve operating means connected to said comparison circuit for controlling said throttle valve opening in accordance with said one or another resultant signal whereby vehicle speed is maintained at said desired speed.

6. The constant speed control system of claim 5, wherein said throttle sensor comprises variable resistor means operatively coupled to said throttle valve for establishing an output voltage proportional to the throttle valve opening, and said converter means includes means responsive to said voltage for producing said pulsed output representative of the throttle opening.

7. The constant speed control system of claim 5 further including: means for generating control signals for controlling said logic sum gate circuit, to pass the summed output pulses of said adding means to said first storage means, said controlling means comprising a manually operable switch actuated by the vehicle operator for setting the desired speed during the selected interval.

8. The constant speed control system of claim 7, wherein said logic sum gate circuit passes said summed pulse signals to the second storage circuit when said control means is released for passing to said second storage circuit signals indicative of the actual speed of the vehicle.

* * * * *

UNITED STATES PATENT OFFICE
CERTIFICATE OF CORRECTION

Patent No. 3,766,367          Dated  October 16, 1973

Inventor(s) Masaharu Sumiyoshi, and Osamu Ito

It is certified that error appears in the above-identified patent and that said Letters Patent are hereby corrected as shown below:

In the heading:

Item [73], change "Wippondenso Co., Ltd." to

--Nippondenso Co., Ltd.--.

Signed and sealed this 17th day of September 1974.

(SEAL)
Attest:

McCOY M. GIBSON JR.
Attesting Officer

C. MARSHALL DANN
Commissioner of Patents